United States Patent [19]
Diamond

[11] 4,267,822
[45] May 19, 1981

[54] INTEGRATED SOLAR ENERGY SYSTEM

[75] Inventor: Edward H. Diamond, East Moriches, N.Y.

[73] Assignee: Grumman Energy Systems, Inc., Bohemia, N.Y.

[21] Appl. No.: 958,783

[22] Filed: Nov. 8, 1978

[51] Int. Cl.³ .............................................. F24J 3/02
[52] U.S. Cl. ................... 126/417; 126/435; 126/431; 165/48 S; 52/220
[58] Field of Search ............... 126/428, 434, 435, 436, 126/446, 417, 431; 165/48, 48 S; 52/220, 309.7, 421, 439

[56] References Cited

U.S. PATENT DOCUMENTS

| | | | |
|---|---|---|---|
| 1,971,242 | 8/1934 | Wheeler | 126/434 |
| 2,553,302 | 5/1951 | Cornwall | 126/428 |
| 2,559,869 | 7/1951 | Gay . | |
| 2,559,870 | 7/1951 | Gay . | |
| 2,811,850 | 11/1957 | Clary . | |
| 3,190,816 | 6/1965 | Adamec . | |
| 3,564,795 | 2/1971 | Henton . | |
| 3,893,506 | 7/1975 | Laing . | |
| 4,000,850 | 1/1977 | Diggs . | |
| 4,010,581 | 3/1977 | Keturi | 52/220 |
| 4,010,733 | 3/1977 | Moore . | |
| 4,018,213 | 4/1977 | Mann . | |
| 4,054,246 | 10/1977 | Johnson . | |
| 4,056,092 | 11/1977 | Meier . | |
| 4,068,652 | 1/1978 | Worthington | 126/431 |
| 4,111,189 | 9/1978 | Dizon | 126/436 |
| 4,164,933 | 8/1979 | Alosi | 126/450 |
| 4,172,311 | 10/1979 | Heyman | 165/48 S |

FOREIGN PATENT DOCUMENTS

| | | | |
|---|---|---|---|
| 2602814 | 8/1977 | Fed. Rep. of Germany . | |
| 432996 | 4/1948 | Italy | 126/434 |
| 600262 | 12/1977 | Switzerland | 126/436 |

Primary Examiner—Herbert F. Ross
Attorney, Agent, or Firm—Mellor A. Gill

[57] ABSTRACT

An integrated system and the process of its manufacture for the absorption of solar energy and for the release of that energy for utilization as required using modular elements that are pre-cast out of low-cost building materials and which can be designed for use with others of the like kind to form structural components of buildings, patios and walkways, and other areas of human activity. Each of the modules has labyrinthine integral passageways cast therein through which a fluid is circulated for the transfer of absorbed energy therefrom. The modules can be combined into a system forming walls of a building in which the outer elements act to absorb solar energy which is transferred to intermediate elements for thermal storage with means being provided to transfer stored energy on demand into interior elements for release of the energy into the interior of the building. In a further embodiment, the modules are assembled to form the patio around a swimming pool and water from the pool is heated by being circulated through the modules. In a still further embodiment, the body of the collector is cast concrete with a system of grooved fluid passageways therein and the side thereof exposed to solar radiation is provided with a perforated metal energy absorber plate having spaced above it a transparent cover plate.

4 Claims, 20 Drawing Figures

INTEGRATED SOLAR ENERGY SYSTEM

BACKGROUND OF THE INVENTION

1. Field of the Invention

The present invention relates to solar energy collector and storage modules and, more particularly, to modular collector and storage elements built of low-cost construction materials such that they can be used also for structural functions.

2. Summary of the Invention

The large scale utilization of solar energy can be enhanced significantly if the installed costs of solar systems can be reduced. A major step in this direction would be the replacement of relatively high-cost materials, such as copper or aluminum, used in solar collector systems with low-cost materials such as concrete or composites. A further step would be the development of solar collector concepts that are multi-functional.

The present invention addresses both of these steps by using low-cost construction materials such as concrete to fabricate modular solar energy collector system elements having the requisite strength and configuration to be integrated as structural parts of buildings and other constructions.

Concrete solar collectors of this invention have a potential efficiency substantially equal to conventional glass and metal collectors. Concrete is a relatively low-cost material and equipment is currently available for layups on a mass production basis. Construction and installation costs can be reduced because the material permits the elements to be molded to virtually any size and shape to fit the requirements and to meet contingencies of construction. Collectors built out of concrete can be patched easily if damaged and the material can be sealed to be impervious to potential corrosion. In addition, the construction material is readily available on almost a universal basis.

In this invention, the fluid passages in the collector and other elements of the system are molded integrally in the concrete body. In the fabrication process a dissolvable material formed into the labyrinthine configuration desired for the fluid passages is embedded in a matrix of concrete contained in a mold which will impart to the cast a desired size, shape, and finish. The dissolvable material is then dissolved by a suitable solvent to leave a pattern of voids that form fluid passageways in the concrete. The concrete is then allowed to cure both in the mold and after removal therefrom as required. After curing, the modular slabs and other shapes so produced can be used as wall elements of buildings, the floors or the aprons or patios around swimming pools and for any other structural function in which the capability of the elements to collect solar radiation, to store the collected energy, and to radiate it as required is of value. In an alternate embodiment of the solar collector of my invention, the body of the collector is cast concrete with a system of grooved fluid passageways therein and the side exposed to solar radiation is provided with a perforated metal energy absorber plate having spaced above it a transparent cover plate.

DESCRIPTION OF THE PRIOR ART

The prior art, in the teachings of R. L. Clary (U.S. Pat. No. 2,811,850) and J. V. Henton (U.S. Pat. No. 3,564,795), shows that it is old to pre-cast or otherwise mold concrete and similar compositions into modular structural units having integral passageways therein, the units being used to erect buildings and the like. Henton proposes to use the integral passageways for utility ducts for pipe and wire runs, and Clary teaches the use of the passageways for the circulation of hot or cold air which is discharged through ducts into the free space in the buildings. Neither Henton nor Clary teach modular, pre-cast construction elements having integral system of labyrinthine interconnected internal passageways that can be used as solar collectors nor do they teach the assembling of the elements to provide a system that can collect solar energy, store it, and thereafter re-radiate the energy for utilization on demand.

The prior art shows building constructions per se in which solar radiation incident on the building or a more-or-less conventional solar collector integrated therein is used to provide a thermal input thereto, means being provided for the circulation of fluids through structural members to heat and cool the building. Such constructions, as disclosed by F. W. Gay (U.S. Pat. Nos. 2,559,869 and 2,559,870), R. E. Diggs (U.S. Pat. No. 4,000,850), H. J. Mann, Jr. (U.S. Pat. No. 4,018,213), and A. F. Johnson (U.S. Pat. No. 4,054,246), do not teach low-cost, pre-cast concrete modules having a system of integral fluid passageways therein that can be assembled into a structural system not only for the collection of solar energy but also for the storage and subsequent utilization thereof. Structural panels having heat absorbing and radiating capabilities that can be assembled to form the roof, walls, and floors of a building are taught by N. Laing (U.S. Pat. No. 3,893,506); however, the basic premise of the constructions taught therein involves a large-surface-area metal element which acts as a heat absorbing sink in heat-transferring association with another large-surface-area metal element which acts as a heat emitting source. It will be seen that the complexity and cost of the panels of Laing with their formed sheet metal elements and other manufactured parts is exactly contrary to the design objectives attained in the simple molded structural elements of the present invention.

In the prior art also, H. K. Meier et al. (U.S. Pat. No. 4,056,092) disclose a flat plate solar energy collector having a molded concrete body; however, the collector taught therein is provided with a transparent cover sheet on its side facing the direction of insolation, thus the cost and strength advantages, and the universality of structural use of the all concrete collector of this invention is sacrificed. A prior art use of a solar device which employs a concrete surface on the side of the apparatus facing the direction of insolation is the solar distillation device disclosed by O. T. Adamec (U.S. Pat. No. 3,190,816). There is no teaching in Adamec, however, of concrete modules having labyrinthine integral passageways that can be used not only for the collection of solar energy but also for the storage and subsequent utilization thereof.

OBJECTS OF THE INVENTION

A principal object of the present invention, therefore, is to provide a low-cost structural module that can be assembled with others of like kind into a solar energy collection, storage, and dispensing system that can be integrated into a construction as a structural component thereof.

It is a further object of the present invention to provide a solar energy collection and dispensing system that can be fabricated of low-cost, readily available construction materials.

It is another object of the present invention to provide a method for fabricating an efficient solar collector that does not require a cover plate or window of glass or other transparent material nor the metal tubes and costly like components of conventional solar collectors.

DESCRIPTION OF THE DRAWINGS

For the purpose of illustrating the invention, there is shown in the drawings the forms which are presently preferred; it should be understood, however, that the invention is not necessarily limited to the precise arrangements and instrumentalities here shown.

DESCRIPTION OF THE PREFERRED EMBODIMENTS

Figure 1:
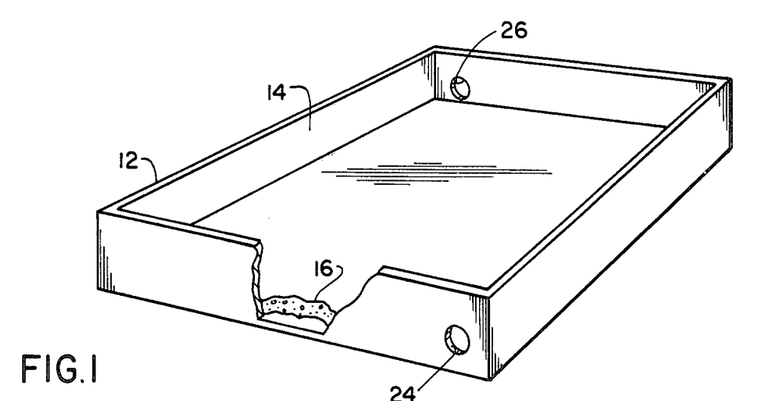
FIGS. 1-4 are perspective views partially in section illustrating successive steps in the manufacture of solar collector modules in accordance with the invention.
Figure 2:
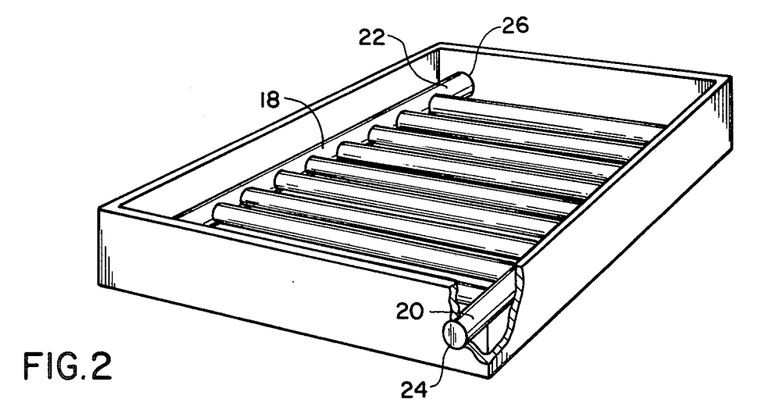
Figure 3:
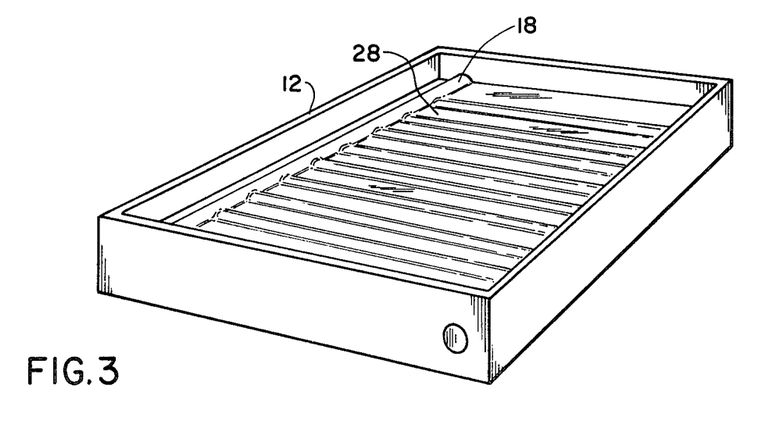
Figure 4:
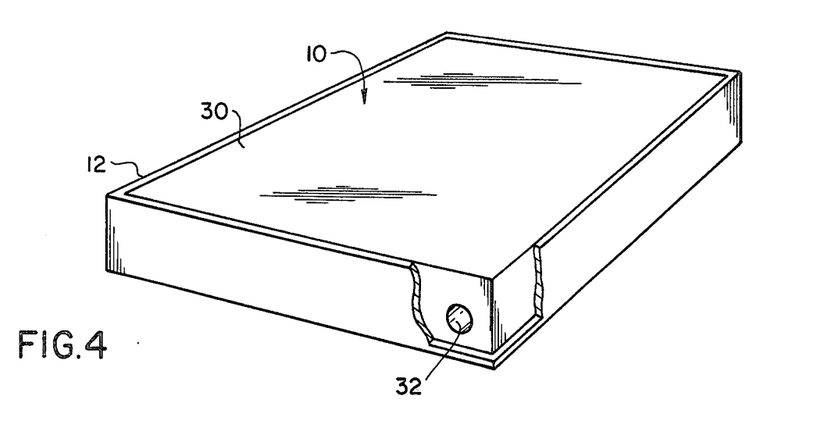

The solar collector of my invention can be fabricated in any suitable manner by casting in a mold a concrete module having the required external configuration and dimensions which has embedded therein a preform of dissolvable material that has been shaped into the desired configuration of the internal labyrinthine passageways of the collector and then dissolving the preform material to produce a concrete collector module having integral fluid passages. A preferred method of fabrication is illustrated diagrammatically in FIGS. 1 through 4. Referring now to FIG. 1, into an open-topped form or mold 12, having an interior cavity 14 whose dimensions and shape will produce a product of the desired final shape and size and whose surfaces will impart to the molded material the desired surface finish, is sprayed or poured a layer 16 of a suitable cement mixture. The mixture can be a regular cement and can, as is well known in the art, contain lightweight aggregates and other additives to reduce the weight of the structure and to provide other desired qualities. Additives such as fiberglas fibers can be incorporated not only to reduce weight but also to impart strength to the concrete; the choice of the additives used is, of course, guided by the compatibility of the materials selected with the process of the invention. Layer 16 is built up to the required thickness and for modules that will be used for horizontal floor elements and the like, the surface of the layer can be inclined appropriately such that the passageways to be produced in the module by the steps to be described are given the required slope to be gravitationally self-draining. Upon layer 16 (see FIG. 2) is laid a preform 18 that is sized and shaped out of a dissolvable material such as expanded polystyrene in a pattern or configuration of the fluid passageway system that is going to be formed in the module. The end sections 20 and 22 of the preform that, in this embodiment, will form the inlet and outlet openings of the internal passageways of the finished module are aligned with ports 24 and 26 respectively in the side of the mold 12. Then the voids around the various features of the preform 18 are filled with a high cement-ratio sand concrete 28 (FIG. 3). A top layer 30 of the cement mixture is then poured or sprayed into the mold until the module 10 attains its final form and thickness. Following these steps, a solvent of the material of the preform 18, such as gasoline in the case of expanded polystyrene, for example, is then introduced by any suitable means (not shown) through ports 24 and 26 in the mold 12 to dissolve the preform to thereby leave voids that form the system of passageways 32 (see FIG. 4) in the module 10. The module is then allowed to cure in the mold for an appropriate time, suitably about 16 hours. Following this, the module is removed from the mold and is allowed to cure wet, preferably for about seven days.

The spectral absorption of the surface of the module 10 that will be exposed to insolation may be enhanced by means generally known in the art such as by the incorporation of additives in the casting material or by the application of suitable known coatings to the surface. Means such as enlarged bores in the inlet and outlet portions of the passageways 32 in which nipples are fitted or other similar coupling expedients are supplied as required such that individual collector modules can be interconnected for assembly into a system. It will be appreciated that the configuration of the internal labyrinthine passageways will be designed for maximum efficiency for the application for which the module is intended. Thus, the module can have a system of labyrinthine or sinuous passageways of various configurations and multiple rows forming more than one system of passageways in a single module can also be provided.

In operation, a number of collector modules 10 are joined together in a desired configuration and are connected for fluid transmission by inserting nipples or other suitable coupling means in the inlet and outlet ends of the internal passageways 32 so that the modules are in fluid communication with each other. The modules can be connected in parallel, that is, all the outlet conduits are connected to one another and all the inlet conduits are connected to one another, or they can be series connected with the outlet of one module being connected to the inlet of the adjoining module, such that a desired pattern of fluid flow through the array of modules is established. Other suitable means for interconnecting the inlet and outlet conduits may be used according to techniques well-known in the art. By suitably coupling appropriate modules in a vertical contiguous orientation a system can be produced for use as a structural wall of a building which will also function to collect solar energy and store it and subsequently radiate it on demand for utilization in the building. Coupling together a plurality of collector modules in a horizontal orientation permits an array of collectors of virtually any size or configuration to be constructed. It should also be understood that the peripheral configuration of the individual modules is not necessarily limited to orthogonal shapes, such as a square or rectangle, because the casting process permits any required shape to be employed so that collector assemblies using a number of such modules may be assembled into an array having any desired configuration.

Figure 5:
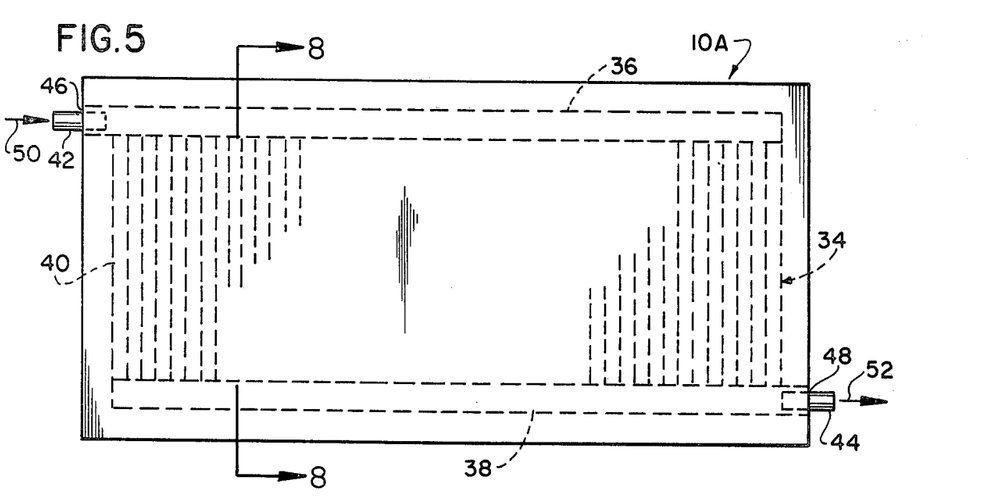
FIG. 5 is a plan view of a solar collector module of the invention.
Figure 6:
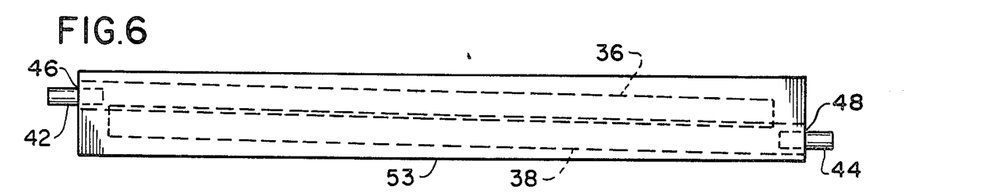
FIG. 6 is a side elevational view of the solar collector module of FIG. 5.
Figure 7:
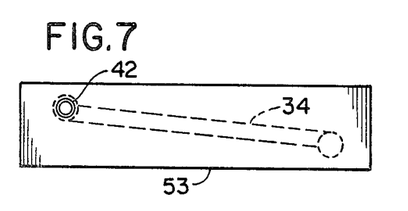
FIG. 7 is an end view of the module of FIG. 5.
Figure 8:
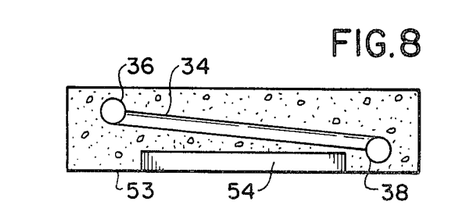
FIG. 8 is a transverse cross-sectional view, substantially on line 8—8 of FIG. 5.

The structural properties and the material of construction of the collectors of this invention give the collector modules characteristics that make them suitable for use as paving units through which hot fluids can be circulated to melt ice and snow in winter or for use as solar collectors in summer. An application of the modules that is particularly suitable is their use around swimming pools as walks or patios that also function as solar collectors to warm the water in the pools. An embodiment of the solar collector of this invention suitable for such application is illustrated in FIG. 5. Collector module 10A embodied therein suitably is made by the process of the invention in a rectangular planar shape which can have any appropriate overall size. The module has a system of internal labyrinthine water passageways 34 comprising an inlet manifold 36, an outlet manifold 38, and transverse passages 40 joining the two manifolds. Passages 40 are closely spaced for good heat transfer. Nipples 42, 44 or other suitable coupling means are provided at the inlet 46 of the inlet manifold 36 and at the outlet 48 respectively of the outlet manifold. The internal passageways are shaped and sized in accordance with good design practice for uniform flow distribution and the transverse passages are closely spaced for good heat transfer. In addition, as indicated in FIGS. 6–8, the inlet port 46 of the module is at a higher elevation than the outlet 48 and both of the internal manifolds and the transverse passages are sloped downward in the direction of flow (indicated by directional arrows 50, 52) to allow for gravitational draining of the internal passageway system. This self-draining feature allows daily drainback of the system when the pump is off and thus precludes the possibility of the freezing of standing water in the system by a drop in temperature. The bottom 53 of the module 10A can be provided with a recess 54 as a weight reduction measure.

Figure 9:
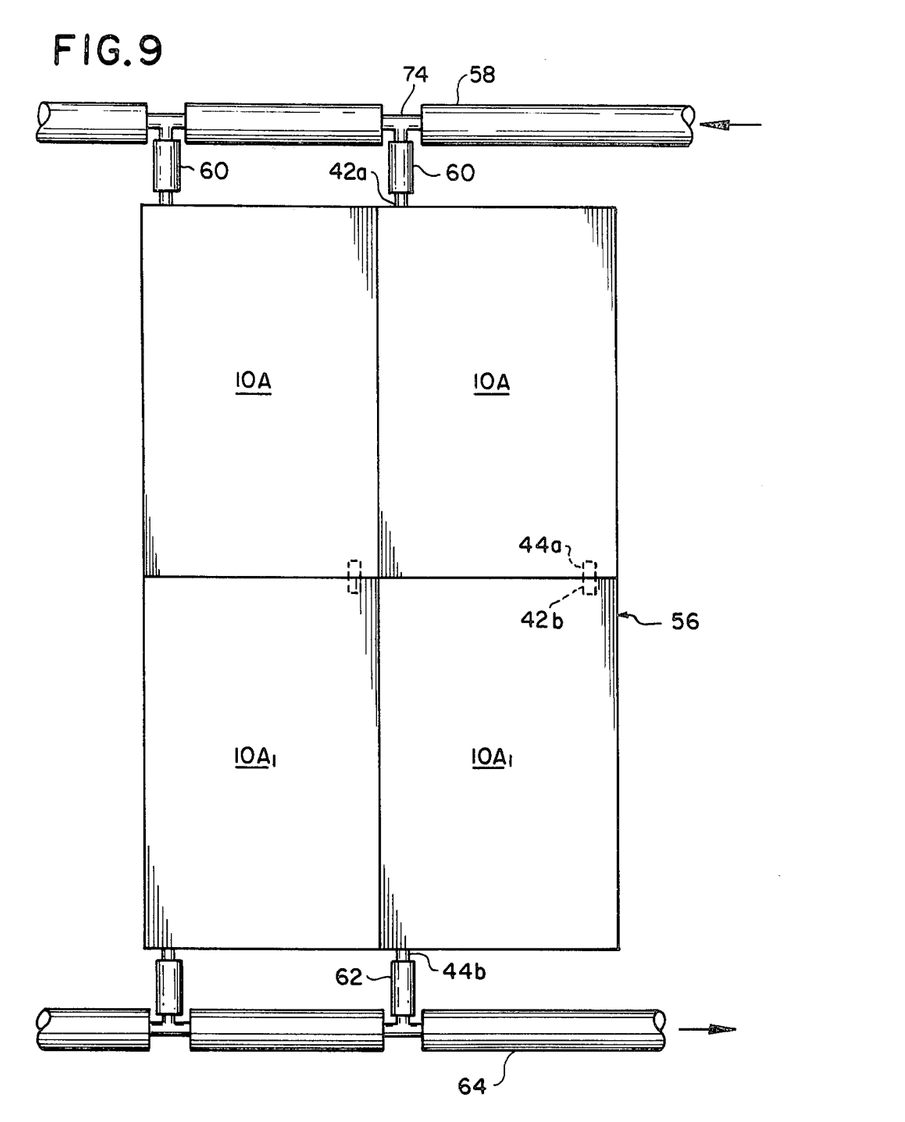
FIG. 9 is a diagrammatic plan view of an array of the modules of FIG. 5.
Figure 10:
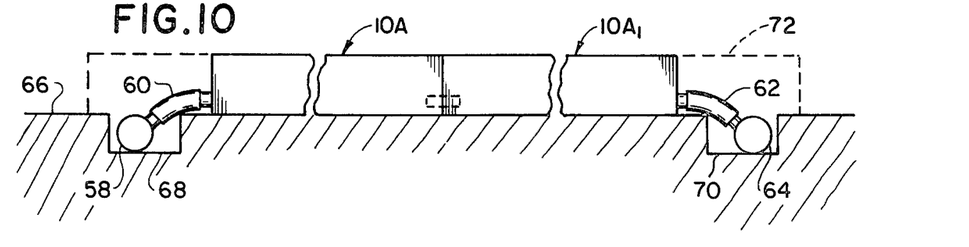
FIG. 10 is a diagrammatic side view of the array of FIG. 9.
Figure 11:
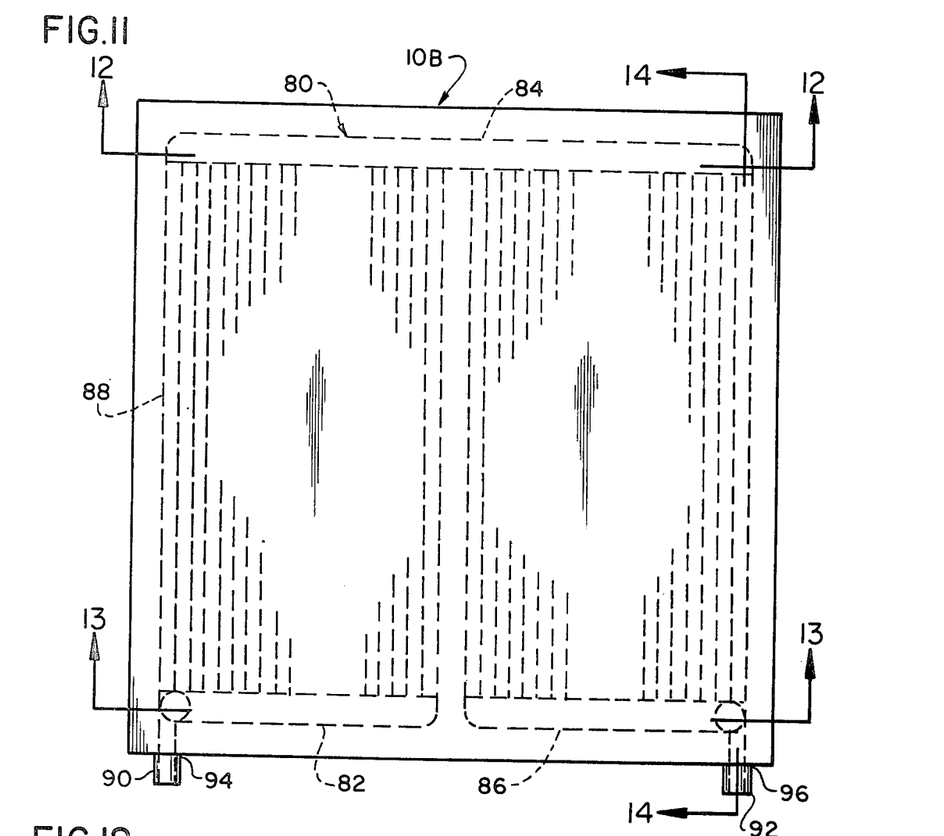
FIG. 11 is a plan view of an alternate embodiment of a solar collector module of the invention.

Module 10A can be connected together with like elements to form a patio or deck 56 surrounding, for example, a swimming pool (not shown) as illustrated in FIGS. 9 and 10. Water from the swimming pool is pumped through a supply pipe 58 and inlet pipes 60 and passes into the first row of collector modules 10A through inlet nipples 42a. Passing through the collectors and being heated by solar energy as it does, the water flows out of outlet nipples 44a and into the second row of collector modules 10A₁ by means of inlet nipples 42b. From the second row of collectors (or subsequent rows if more than two are provided) the flow passes out of the respective outlet nipples 44b to outlet pipes 62 and is returned by a means of return pipe 64 to the swimming pool carrying the heat that had been imparted to it by solar insolation in the collector modules.

The collector modules can be provided with a suitable foundation 66 or may rest directly on the earth (FIG. 10). Runs or troughs 68 and 70 accommodate the supply pipe 58 and the return pipe 64 respectively. Concrete blocks 72 having appropriate clearance areas molded therein can be used to conceal and protect the piping of the system. It will be appreciated that the necessary T-fitting 74 and other well known components (not shown) of a solar collector system are provided as required to ensure efficiency in operation.

Figure 12:
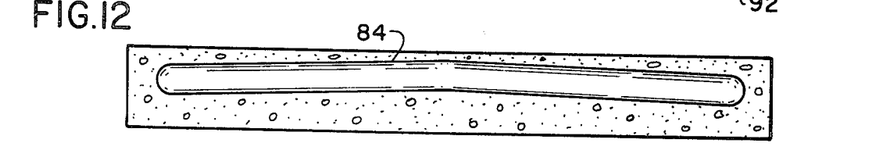
FIG. 12 is a transverse cross-sectional view, substantially on line 12—12 of FIG. 11.
Figure 13:
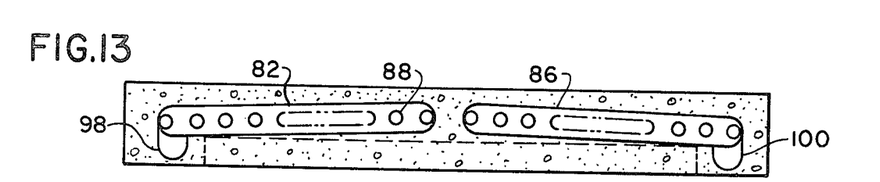
FIG. 13 is a transverse cross-sectional view, substantially on line 13—13 of FIG. 11.
Figure 14:
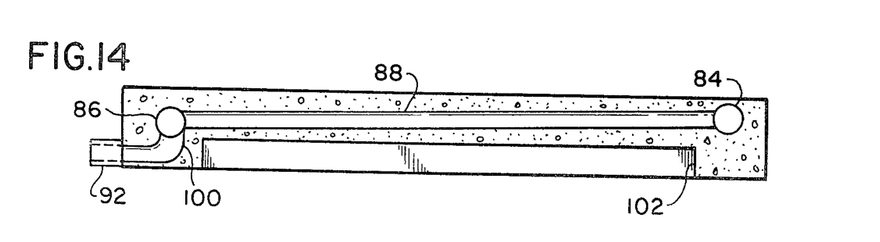
FIG. 14 is a transverse cross-sectional view, substantially on line 14—14 of FIG. 11.

A further embodiment of the solar collector module of this invention which has the inlet and outlet ports on the same side is shown in FIGS. 11–14. As has been stated with respect to module 10A, the collector module 10B of this embodiment is suitably made by the process of this invention in a rectangular shape which can have any appropriate overall size. The module has internal water passageways 80 comprising an inlet manifold 82, a transfer manifold 84, an outlet manifold 86, and transverse passages 88 connecting the inlet manifold to the transfer manifold and the transfer manifold to the outlet manifold. Nipples 90, 92 or other suitable coupling means are provided at the inlet 94 of the inlet manifold 82 and at the outlet 96 respectively of the outlet manifold. As in the FIG. 5 embodiment of the collector module, the internal passageways are sized and shaped for uniform flow distribution and good heat transfer characteristics and also they are sloped appropriately to allow for gravitational self-draining of the module's passageways. Thus, inlet manifold 82 is sloped in the direction of inlet 94, outlet manifold 86 is sloped in the direction of outlet 96 (see FIG. 13) and transfer manifold 84 has an inverted, very shallow "V" shape with the apex thereof having a higher elevation than the ends of the legs of the "V" as shown in FIG. 12. In addition, as indicated in FIG. 14, the transverse passages 88 are sloped downward from the transfer manifold 84 in the direction of the inlet and outlet manifolds. Also, as indicated in FIG. 13, the inlet and outlet portions of the internal passageways 80 have a short vertical section 98 and 100 respectively to allow clearance for a recess 102 in the bottom of the module if such expedient is adopted for weight reduction.

Figure 15:
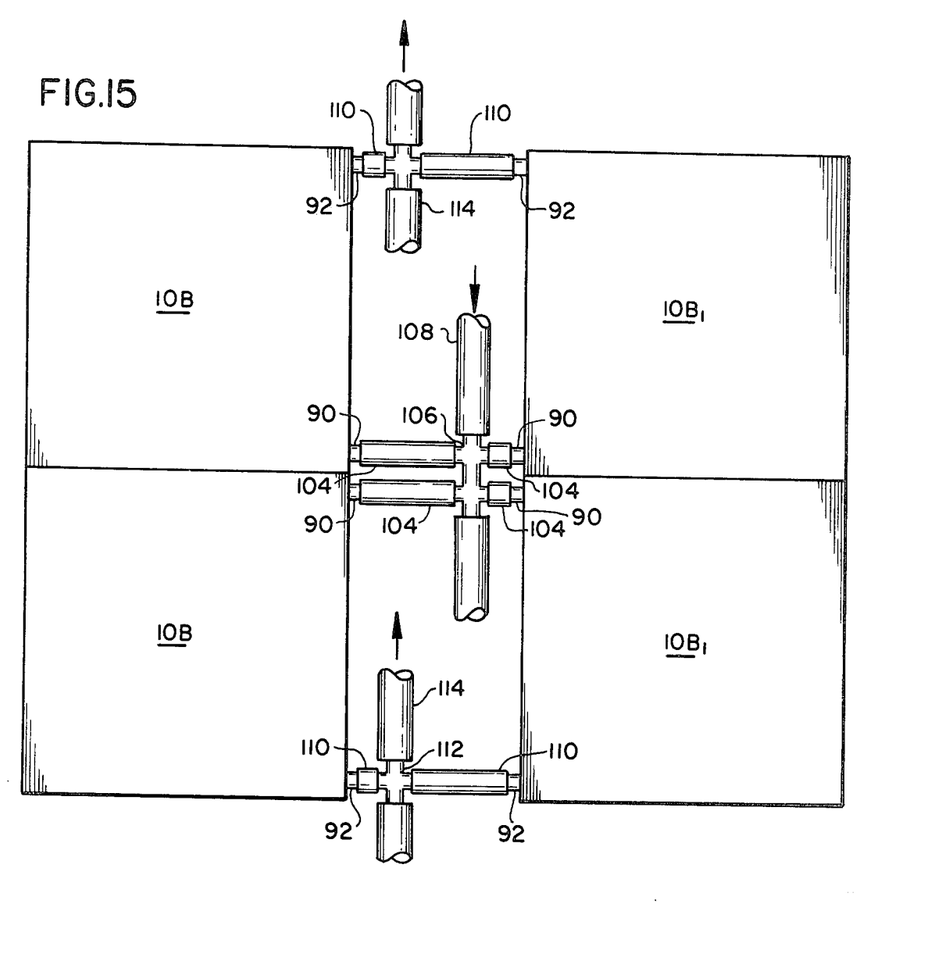
FIG. 15 is a diagrammatic plan view of an array of the modules of FIG. 11.
Figure 16:
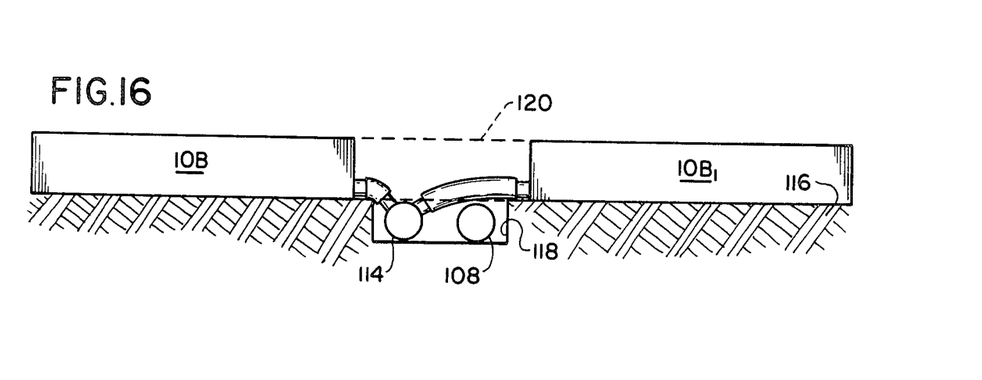
FIG. 16 is a diagrammatic end view of the array of FIG. 15.

Module 10B can be connected together with like elements as has been described previously for the module embodied in FIG. 5. The modules 10B would be assembled (see FIG. 15) with their inlet nipples 90 connected to inlet pipes 104 which are coupled by means of T-fittings 106 to a supply pipe 108 which connects to a swimming pool or other source of water (not shown) which it is desired to heat, and their outlet nipples 92 connected to outlet pipes 110 which are coupled by means of T-fittings 112 to a return pipe 114 by which the water pumped through the system is returned to the swimming pool carrying the heat which has been imparted to it by insolation in the solar collectors. The collector modules can be provided with a suitable foundation or may rest directly on the ground 116. A trough or run 118 is provided to accommodate the supply 108 and return 114 pipes. Concrete blocks 120 having appropriate clearance areas provided therein and sized to fit over the pipe trough 118 are laid between the rows of collector modules to conceal and protect the piping of the system (FIG. 16).

Figure 17:
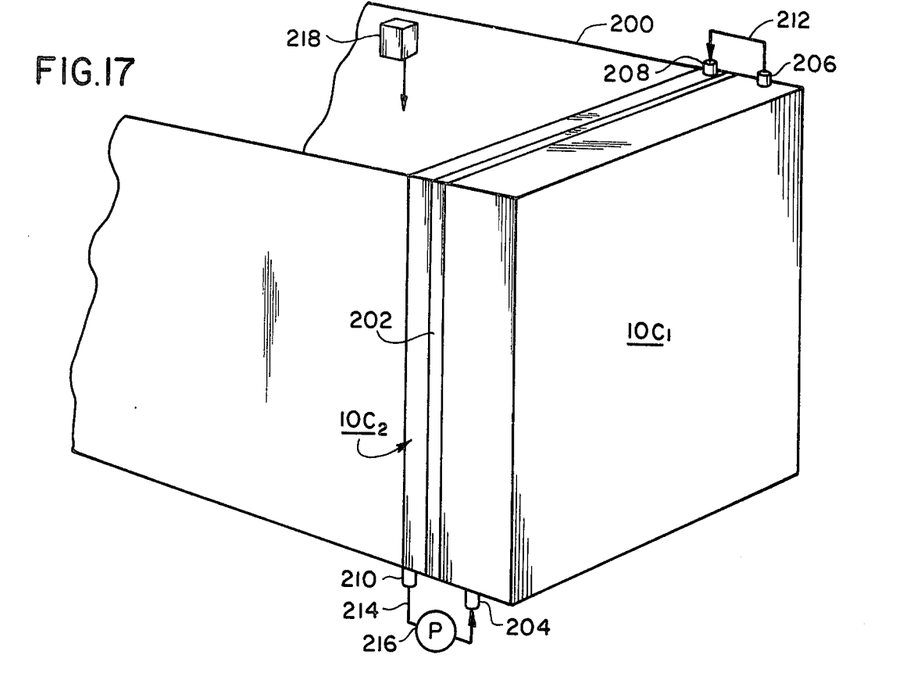
FIG. 17 is a diagrammatic view of modules of the invention embodied in a building.

FIG. 17 illustrates the solar collector modules of this invention utilized as structural wall members of a room 200 of a building (not shown). In this embodiment, module $10C_1$ is used as the outer wall of the room, functioning as a solar collector and storage unit, and a second module $10C_2$ serves as the inside wall. The outer and inside walls preferably are separated by a layer 202 of thermal insulation. Outer module $10C_1$ has an inlet pipe 204 connected to the internal passageways thereof and an outlet pipe 206 therefrom, and inside module $10C_2$ has an inlet pipe 208 and an outlet pipe 210 connected to its system of internal passageways. Appropriate piping or ducting 212 couples the outlet of the outer module to the inlet of the inside module and piping or ducting 214 couples the outlet of the inside module to the inlet of the outside module. A pump 216, if the working fluid of the system is a liquid or a fan if the fluid is air is located in ducting 214 and a thermostat 218 for effecting the operation of the pump in suitably installed in room 200. A suitable electrical power source for the fan or pump and associated electrical circuitry and control means are provided; such components and others of a solar heating system such as an expansion tank, freeze check valves, freeze dump valves, can be provided as required. Inasmuch as these ancillary components are well known and in common use in the art, in the interests of clarity and brevity they are not shown and will not be described further.

In operation, the working fluid in the internal passageways (not shown) of the outer wall module $10C_1$ is heated by the sun. When the room thermostat 218 calls for heat, the pump 216 is actuated such that solar-heated fluid from collector module $10C_1$ is delivered through ducting 212 to module $10C_2$. The heated fluid circulating through the internal passageway system (not shown) of module $10C_2$ transmits heat into room 200 by free convection and radiation. After passing through the inner wall module, during which time it has lost heat, the fluid is returned by pump 216 through duct 214 to exterior wall module $10C_1$ for re-heating.

Figure 18:
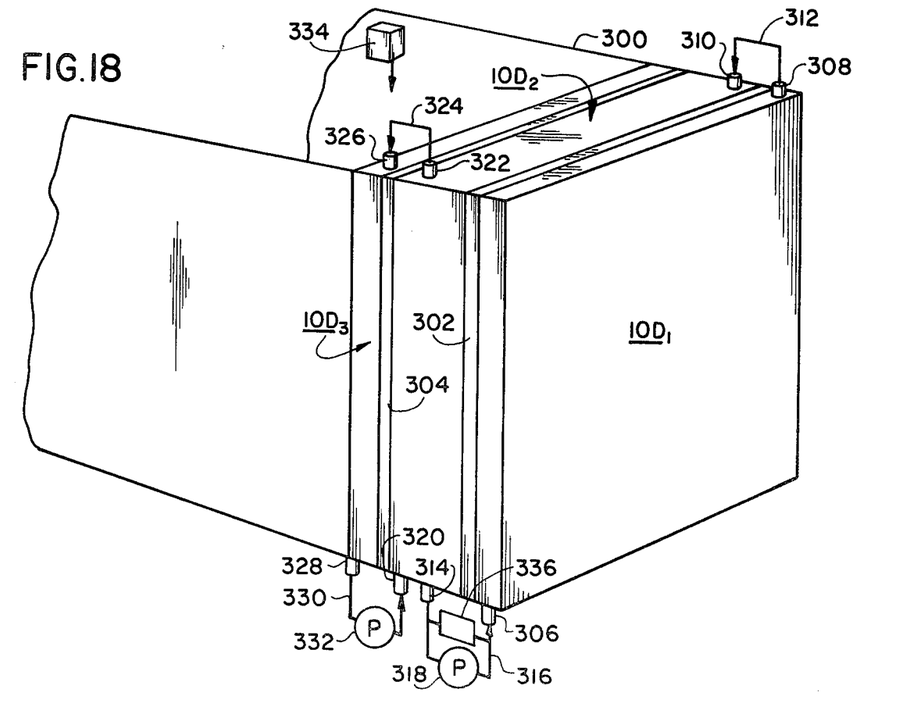
FIG. 18 is a diagrammatic view of an alternate arrangement of modules of the invention embodied in a building.

A further embodiment of the modules of this invention incorporated in a structural system is illustrated in FIG. 18. In this embodiment, the modules are used as structural wall members of a room 300 of a building (not shown). An outer module $10D_1$ functions as a solar collector and storage unit, an intermediate module $10D_2$ is a energy storage unit, and module $10D_3$ serves as the inside wall element of the room 300. The storage module $10D_2$ can be thicker than either the collector or the inner wall module such that a greater "density" of internal passageways can be provided to increase thereby the thermal storage capacity of the unit. As is well known, the passageways of the storage module can be filled with bodies such as stones or rocks or other media to increase the amount of heat stored. As is also known, other heat storage materials such as those that undergo a change of state can be used. Known materials include inexpensive eutectic, phase-change salts such as, for example, sodium sulfate decahydrate, and the like. The outer module and the inside module preferably are separated from the intermediate storage module by layers 302 and 304 respectively of suitable thermal insulation.

Outer collector module $10D_1$ has an inlet pipe 306 connected to the internal passageways thereof and it has an outlet pipe 308 therefrom. Storage module $10D_2$ has an inlet pipe 310 connected to the outlet 308 of the outer collector module by means of ducting 312 and an outlet pipe 314 connected to the inlet 306 of the outer module by ducting 316. A pump or fan 318 is provided in duct 316 for circulating fluid between the collector and the storage modules. Storage module $10D_2$ also has a second inlet pipe 320 and a second outlet pipe 322. The outlet 322 is connected by means of ducting 324 to the inlet pipe 326 of the inside module $10D_3$ which also has an oulet pipe 328 connected to inlet pipe 320 of storage module $10D_2$ by means of ducting 330. A pump or fan 332 is provided in duct 330 for circulating fluid between the inside and intermediate modules. The storage module is cored to have two separate passageway systems such that fluid circulated in the first passageway system from the outside collector module $10D_1$ by pump 318 is in heat exchange relationship with but does not contact the fluid in the second passageway system circulated from the inside module $10D_3$ by pump 332. With such an arrangement in which the fluid from the outer module does not contact the fluid used in the inside wall module, it is feasible to use air or a non-freezing (at the expected temperatures) liquid in the outside internal passageway system and water or the like in the inside internal passageway system. A thermostat 334 for effecting the operation of pump 332 is suitably installed in room 300, and control of pump 318 as a function of the relative temperature of the fluid in the collector module $10D_1$ with respect to the fluid in the storage module $10D_2$ is accomplished by temperature sensing means 336. A suitable electrical power source for the pumps and associated electrical circuitry and control means are provided. As has been stated with regard to the FIG. 17 embodiment of the invention, such components and others of solar heating systems per se are well known and are in common use and it is believed, therefore, that no useful purpose will be served by showing or describing them herein.

In operation, the working fluid in the internal passageway system (not shown) of the collector module $10D_1$ is heated by the sun. When the temperature of the fluid in the collector exceeds that of the fluid in the storage module, the pump 318 is activated to circulate the fluid into the first passageway system in the storage module for storage therein. When the room thermostat 334 calls for heat, the pump 332 is activated such that solar-heated fluid in the second passageway system (which is in heat exchange relationship with the first passageway system and is heated thereby) of the storage module is delivered through ducting 324 to the inside wall module $10D_3$, where the heated fluid transmits heat into room 300 by free convection and radiation. Pump 332 circulates fluid between the storage and the inside wall modules as required to maintain the fluid at the desired temperature.

Figure 19:
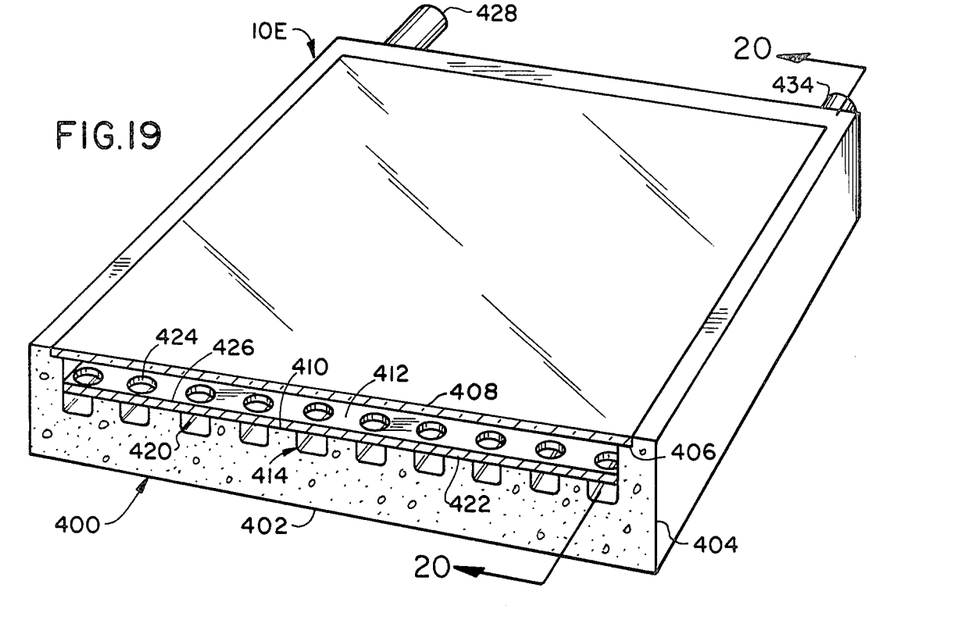
FIG. 19 is a perspective view partially in section of another alternate embodiment of a solar collector module of the invention.
Figure 20:
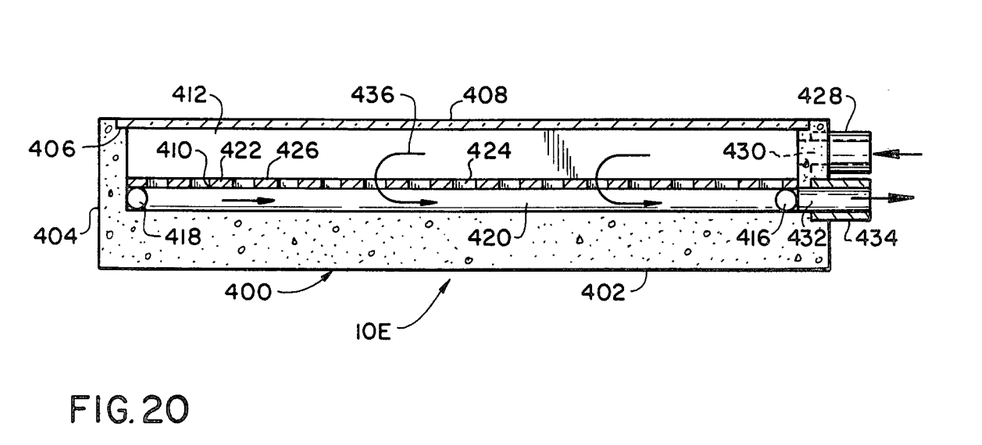
FIG. 20 is a transverse cross-sectional view, substantially on line 20—20 of FIG. 19.

FIGS. 19 and 20 illustrate a further embodiment of a solar collector module 10E constructed in accordance with this invention. Module 10E has a generally flat rectangular configuration and has a body 400 which is preferably cast or molded out of cement by the process of this invention. The cement can also contain lightweight aggregates and other additives to reduce the weight of the structure or to provide other desired properties. The body 400 comprises a base 402 portion and an integral peripheral wall 404 extending around the sides thereof. A shoulder 406 extending around the upper periphery of wall 404 provides a ledge upon which a sheet 408 of transparent material rests. Any suitable sealing means (not shown) may be used to retain the sheet 408 and to provide a hermetic seal between the edges thereof and the shoulder 406. Sheet 408 forms the cover of the collector and between it and the recessed upper surface 410 of the base 402 is defined a chamber 412. Molded into surface 410 are a pattern of fluid channels or passageways 414 having manifolds 416 and 418 across the ends, which manifolds are connected by a multiplicity of passages 420. Resting on surface 410 is a metal absorber plate 422 which is provided with a multiplicity of perforations 424 or through holes which preferably are aligned with passages 420. The absorber surface 426 is made spectrally absorptive by suitable means as by known coatings applied to the surface as is common in the art. An inlet nipple 428 and inlet port 430 are provided for the admittance of fluids into collector chamber 412 and an outlet port 432 and nipple 434 are provided for the discharge of fluids from the collector.

In operation, a circulation of fluid as indicated by directional arrows 436 through the solar collector module 10E is provided by fluid that enters collector chamber 412 through inlet port 430 and passes into channels 414 through perforations 424 in absorber plate 422 and exits from the collector through outlet port 432. Solar energy, passing through the transparent cover plate 408 is absorbed by absorber plate 422 to thereby heat it. This heat is imparted to the fluid circulating through the collector module and the fluid transmits the heat to a suitable heat exchanger for utilization.

It will be appreciated that the solar collector of this embodiment, as is the case with the other modules embodied in the invention, can be installed for use either horizontally or vertically or any desired orientation therebetween. In addition, instead of only a single sheet 408 of transparent material, a double sheet can be employed as is well known in the art.

Although shown and described in what are believed to be the most practical and preferred embodiments, it is apparent that departures from the specific method and apparatus described will suggest themselves to those skilled in the art and may be made without departing from the spirit and scope of the invention. I, therefore, do not wish to restrict myself to the particular instrumentalities illustrated and described, but desire to avail myself of all modifications that may fall within the compass of the appended claims.

Having thus described my invention, what I claim is:

1. A solar collector module comprising a cast concrete body, a recess in the upper surface of said body, a plate transparent to solar radiation covering said recess in a sealed relationship therewith, the floor and walls of said recess with said transparent plate defining a hermetic chamber in said body, a pattern of labyrinthine interconnected channels in the floor of said recess, a perforated metal absorber plate on said floor overlying said channels, at least some of the perforations in said absorber plate being aligned with said channels, said metal plate absorbing solar energy passing through said transparent plate, an inlet port opening into said hermetic chamber, an outlet port opening on said channels, said ports communicating with the outside of said module, whereby the circulation of fluid through said inlet into said chamber and through said perforations in said metal plate imparts heat to said fluid when said metal plate is absorbing solar energy such that, when said heated fluid passes into said channels and out said outlet port, said heat is transferred outside of said module for utilization.

2. In a solar heating system for a building, a first and a second contiguous module defining a structural wall of a room in said building, said first module forming the outer element and said second module forming the inner element of said wall, a layer of thermal insulation between said first and second modules, each of said modules having a cast concrete body with a system of labyrinthine, interconnected internal passageways therein, said passageways being closely spaced for good heat transfer therebetween and having uniform flow distribution characteristics, inlet and outlet means for said internal passageways communicating with the outside of the module for the induction and the eduction of fluid, fluid coupling means connecting the outlet and inlet of said first module to the inlet and outlet respectively of said second module such that fluid can be circulated through and between said modules, a pump in the fluid coupling means connecting the outlet of said second module with the inlet of said first module to effect said circulation of said fluid, a control system for controlling the operation of said pump as a function of temperature, said control system having a thermostat installed in said room, internal passageways of said first module being in good heat exchange relationship with a surface thereof exposed to insolation such that when said module is absorbing solar radiation the fluid therein is heated, internal passageways of said second module being in good heat exchange relationship with the surface thereof defining a wall of said room, said control system activating said pump when said thermostat calls for heat whereby heated fluid is circulated out of said first module to said second module to thereby condition the temperature of said room by free convection and radiation.

3. In a solar heating system for a building, first, intermediate, and third contiguous modules defining a structural wall of a room in said building, said first module forming the outer element and said third module the inner element of said wall, a layer of thermal insulation at least between said intermediate and said third modules, each of said modules having a cast concrete body, the first and third modules having a single and the intermediate module a first and a second system of labyrinthine, interconnected internal passageways therein, said passageways being closely spaced for good heat transfer therebetween and having uniform flow distribution characteristics, inlet and outlet means for each of said systems of internal passageways communicating with the outside of the module for the induction and eduction of fluid, fluid coupling means connecting the outlet and inlet of said first module to the inlet and outlet respectively of the first passageway system of said intermediate module and fluid coupling means connecting the outlet and inlet of the second passageway system of said intermediate module to the inlet and outlet respectively of said third module such that fluid can be circulated through and between said modules, a first pump in the fluid coupling means connecting the outlet of said first passageway system of said intermediate module with the inlet of said first module and a second pump in the fluid coupling means connecting the outlet of said third module with the inlet of said second passageway system of said intermediate module to effect the circulation of said fluid, a control system for controlling the operation of said pumps as a function of temperature, said control system having a thermostat installed in said room and relative fluid temperature sensing means for sensing the temperature of the fluid in said first module and said first passageway system of said intermediate module, internal passageways of said first module being in good heat exchange relationship with a surface thereof exposed to insolation such that when said module is absorbing solar radiation the fluid therein is heated, said control system activating said first pump when the temperature of the fluid in said first module exceeds that of the fluid in said first passageway system of said intermediate module such that said heated fluid is circulated into said intermediate module for storage therein, said stored heated fluid in said first passageway system of said intermediate module being in heat exchange relationship with and heating the fluid in said second passageway system therein, internal passageways of said third module being in good heat exchange relationship with the surface thereof defining a wall of said room, said control system activating said second pump when said thermostat in said room calls for heat whereby heated fluid is circulated out of said intermediate module to said third module to thereby condition the temperature of said room by free convection and radiation.

4. The solar heating system of claims 2 or 3 wherein the modules have a substantially planar surface.

* * * * *